A-B

INVENTORS:
KARL WILHELM BREER, ERWIN WEINBRENNER.

United States Patent Office 3,705,821
Patented Dec. 12, 1972

3,705,821
PROCESS AND APPARATUS FOR APPLYING POLYURETHANE FOAM-FORMING COMPOSITION
Karl Wilhelm Breer, Cologne, and Erwin Weinbrenner, Opladen, Germany, assignors to Farbenfabriken Bayer Aktiengesellschaft, Leverkusen, Germany
Continuation-in-part of application Ser. No. 683,370, Nov. 15, 1967. This application Aug. 7, 1970, Ser. No. 70,605
Int. Cl. B44d 1/02
U.S. Cl. 117—105.3        3 Claims

ABSTRACT OF THE DISCLOSURE

Improved apparatus for spraying a polyurethane foam-forming composition including substrate means onto which the composition is sprayed; means to longitudinally move the substrate so as to continuously receive said composition spray at least partially on a previously uncovered part thereof whereby to form a continuous foam web; transversing means disposed above the substrate transverse to the direction of movement of the substrate; and spraying means on the traversing means; where the spraying means has a chamber from which polyurethane foam-forming composition is sprayed and has two channel means leading from the chamber through which foam-forming composition passes, which channel means have a substantially cornerless cross-section, preferably round, and are disposed in converging relation to each other such that the channels emerge from the spraying means as spaced apart apertures and such that streams issuing from both apertures simultaneously meet to form a fan shaped combined spray a short distance from the apertures.

Figure 1:
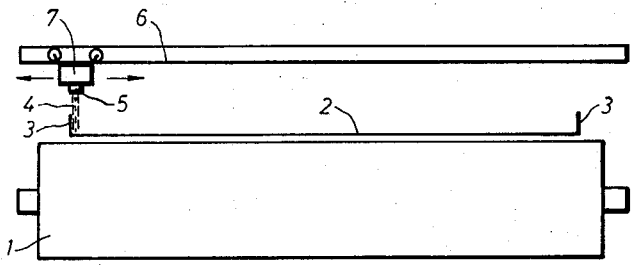

This application of a continuation-in-part of application Ser. No. 683,370, filed Nov. 15, 1967, now abandoned and abandoned concurrently with the filing of this application.

This invention relates to the forming of polyurethane foam articles. It more particularly refers to forming a continuous web of polyurethane foam by spraying a foam-forming composition onto a suitable substrate. This invention resides in both the novel foam-forming apparatus and the process of using such to produce polyurethane foam.

It is known to produce continuous webs or sheets of foam, particularly polyurethane foam, by spraying a suitable foam-forming mixture onto a continuously moving substrate. It is known to traverse the spray head across the moving substrate. It is common to provide longitudinal side walls adjacent the edges of the moving substrate in order to limit the lateral extent of foam generation and to form a neat, properly dimensioned foam product.

Hitherto it has been customary to apply a foam-forming polyurethane mixture onto a film support with such apparatuses as a cone-shaped jet. Owing to the conical shape of the spray, the longitudinal side walls which are continuous with the foam support substrate also got sprayed whenever the reciprocating mixture head reached a reversal point. Furthermore, the application of mixture was very uneven at the edges of the substrate. Owing to the fact that the foaming reaction sets in substantially immediately, the thickness of the foam layer thus formed cannot even itself out by flow after spraying. The resulting foam product was therefore uneven in thickness, unless the article was produced under pressure on a double conveyor belt (conveyor belt below and above) while the foaming reaction was still in process. This external pressure, however, causes the density of the foam to be uneven over its cross-section. If such foam is cut transversely, this lack of uniformity in the foam structure can be clearly seen. Such non-uniform foams can only be used to a limited extent.

It has now surprisingly been found that the uniformity of the density of the foam and also the uniformity of the pore sizes and shapes can be substantially improved by using a fan-shaped jet spray projected with its plane generally parallel to the direction of movement of the substrate support and generally disposed perpendicular thereto instead of by using the conventional cone jet. The fan jet then sprays the mixture exactly up to the lateral edge of the substrate which is usually marked by a perforation in the film support substrate without substantially any mixture being applied to the longitudinal side walls. This means that since substantially no mixture is sprayed onto the longitudinal side walls, the foam can only expand upwards in the desired vertical direction and not horizontally.

To achieve satisfactory application, the mixing head is reciprocated across the moving substrate in known manner at high velocity, say 100 to 200 m./min. Owing to the sudden reversal in the direction of movement at the turning points, the flat fan jet of this invention tends, as a result of centrifugal force, to continue its sideward movement and go beyond the given width of the foam. According to a particular embodiment of the invention, these undesirable effects of this continued sideward movement is avoided by making the fan jet of foamable polyurethane encounter the carrier film at a pressure of at least 0.1 kg./cm.$^2$.

According to the invention, the spray head of the apparatus hereof for carrying out this process has a holding chamber containing polyurethane foam-forming composition and two separate, converging, smooth walled channels leading therefrom. Pressure exerted on the composition in the chamber forces the composition into the channels and then out of the spaced aperture exists thereof in convergence such that the streams issuing meet and form a fan-shaped spray a distance from the apertures.

The process is, therefore, preferably carried out with a spray die equipped with at least one pair of die apertures preferably of equal size directed obliquely towards each other. The fan is in this case only formed outside the nozzle pair, where the two jets meet obliquely. Such a die has a better rinsing action, and therefore less tendency to become occluded than a slot die. It has been found that a good fan jet is formed when the two channels are disposed at an angle of about 40° to each other. The channels preferably have a diameter of about 0.5 to 5 mm. The apertures are preferably spaced apart about 1 to 10 mm.

Figure 2:
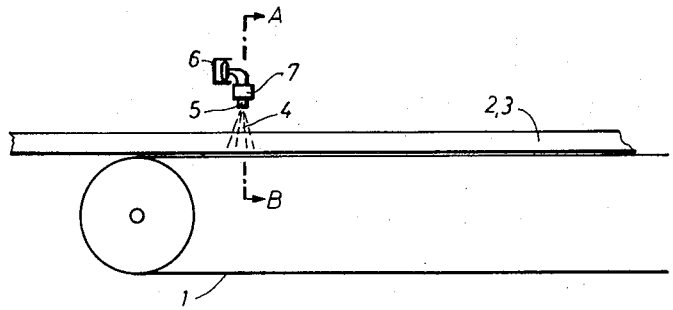

The invention will now be explained by way of example with reference to the accompanying drawings in which
FIG. 1 is a front view of the apparatus of this invention,
FIG. 2 is a side view of the apparatus of this invention, and
FIG. 3 a section through the nozzle head of the apparatus.

FIG. 1, a film support substrate 2 with longitudinal sidewalls 3 rests on a conveyor belt 1. A fan jet 4 extends from a two-aperture die 5 which is arranged in a mixing head 7 which is adapted to reciprocate along rail 6. It is clear that the fan jet 4 can be moved closer to the longitudinal side wall 3 without spraying it than could a conical jet of the prior art.

FIG. 2 shows the direction of expansion of the fan jet 4, a plane parallel to the direction of movement of the substrate and perpendicular to the substrate itself.

Figure 3:
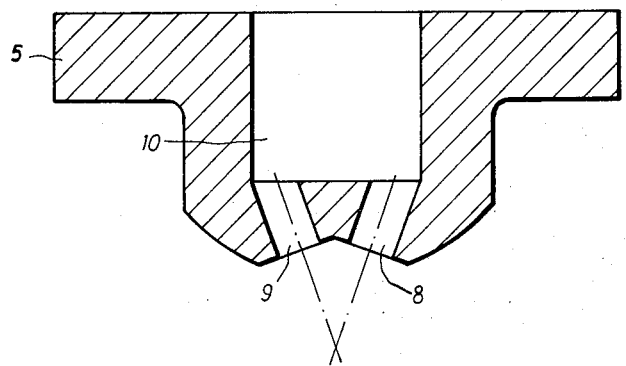

FIG. 3 shows the die head 5 with two channels 8 and 9 extending from a feed chamber 10 at an angle to each other ending in two apertures 11 and 12 respectively.

We claim:
1. An apparatus comprising in combination: means for moving a polyurethane foam-forming spray receiving support in a given direction; a mixing head, including a mixing chamber and at least one pair of channels from said mixing chamber to spaced apertures directed at an angle to each other, said apertures so disposed that material being omitted from each of said apertures does not contact material from the other aperture within said mixing head, said spaced apertures disposed in a plane transverse to the direction of movement of said support, which channels and spaced apertures cause material forced therefrom to form a fan-shaped spray disposed in a plane substantially parallel to the direction of movement of said support; means to move said mixing head transverse to the direction of movement of said support; and means to force material out of said apertures under such pressure that it impacts against said support at a pressure of at least 0.1 kg./cm.².

2. In the process of depositing polyurethane foam onto a moving support, including spraying a polyurethane foam-forming mixture onto said support while traversing a spraying means for said mixture across the path of movement of said support; the improvement which comprises spraying at least one pair of streams of said polyurethane foam-forming mixture toward each other under such conditions that said streams are caused to coincide only outside said spraying means to form a flat cone-shaped fan spray disposed in a plane parallel to the direction of movement of said support, which spraying is carried out at a pressure sufficient to impinge said spray on said support at a pressure of at least 0.1 kg./cm.².

3. The apparatus of claim 1 wherein said die channels are at an angle of about 40° to each other.

References Cited

UNITED STATES PATENTS

| | | | |
|---|---|---|---|
| 2,770,216 | 11/1956 | Schock | 118—323 |
| 2,812,213 | 11/1957 | Bede | 239—544 |
| 3,009,920 | 11/1961 | Weinbrenner et al. | 118—323 X |
| 3,365,137 | 1/1968 | Corsette | 239—453 X |

EDWARD G. WHITBY, Primary Examiner

U.S. Cl. X.R.

117—161 K; 118—323, 324; 239—554, 599

UNITED STATES PATENT OFFICE
CERTIFICATE OF CORRECTION

Patent No. 3,705,821        Dated December 12, 1972

Inventor(s) Karl Wilhelm Breer, et al

It is certified that error appears in the above-identified patent and that said Letters Patent are hereby corrected as shown below:

Column 1, line 10, on line with "3 Claims" should be -- 1 drawing -- .

Column 1, Heading "Foreign Claims Priority" is missing. This should read -- Germany, November 16, 1966, No. F 50 692 -- .

Column 4, line 17, "3,009,920" should read -- 3,009,209 -- .

Column 4, line 18, After "Corsette", "239-453X" should read -- 239-543X -- .

Signed and sealed this 29th day of May 1973.

(SEAL)
Attest:

EDWARD M. FLETCHER, JR.
Attesting Officer

ROBERT GOTTSCHALK
Commissioner of Patents